UNITED STATES PATENT OFFICE.

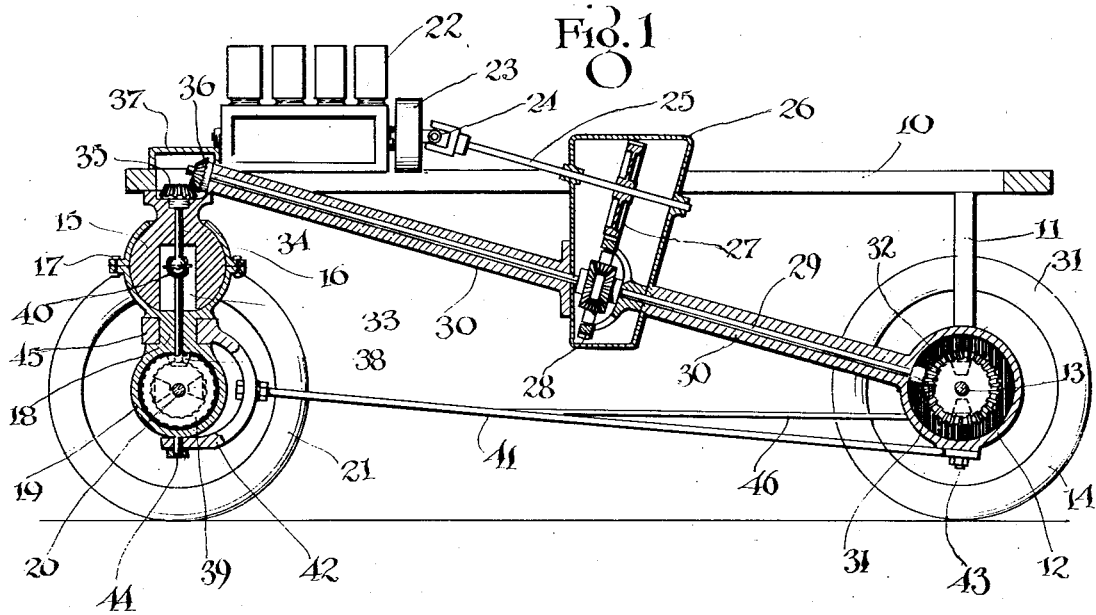

ROY DALTON SMITH AND ALFRED CHRISTOPHERSON, OF MOHLER, IDAHO.

FOUR-WHEEL DRIVE.

1,392,365.  Specification of Letters Patent.  Patented Oct. 4, 1921.

Application filed June 11, 1920. Serial No. 388,136.

*To all whom it may concern:*

Be it known that we, ROY DALTON SMITH and ALFRED CHRISTOPHERSON, citizens of the United States, and residents of Mohler, in the county of Lewis and State of Idaho, have invented certain new and useful Improvements in Four-Wheel Drives, of which the following is a specification.

This invention relates to new and useful improvements in motor or self-propelled vehicles, such as automobiles, and more particularly to improved four wheel drives therefor.

The primary object of the invention is to provide an improved and simple four wheel drive structure by which in addition to driving, propelling or furnishing traction through the rear wheels, the front wheels may also be used for driving purposes, as well as steering purposes, and will allow the necessary rocking and swinging or turning movement to compensate for unevenness in the road surfaces, while the driving parts are so constructed and arranged as to be driven from a common motor and in which the working parts are inclosed and run in oil, thus keeping the same thoroughly lubricated and insuring long life and reduction in the cost of maintenance.

Other and further objects of our invention will become readily apparent to those skilled in the art, from a consideration of the following description when taken in conjunction with the accompanying drawings, wherein:—

Figure 1 is a longitudinal sectional view showing a motor vehicle equipped with a four wheel drive in accordance with the present invention, and Fig. 2 is a transverse vertical sectional view taken through the front drive mechanism.

Referring to the drawings in detail, in which like reference characters designate corresponding parts throughout the several views, 10 designates an automobile chassis or frame provided with the rear portion 11 to which is secured the rear axle housing 12 in which the drive axle or shaft 13 is rotatably journaled, the ends of the axle being keyed to the rear drive wheels 14. The rear axle is adapted to be driven in a manner to be hereinafter more fully set forth.

At the front portion of the frame or chassis, there is disposed a rocker and swivel joint including a ball 15 having an attaching plate securely and stiffly bolted to the front portion of the frame, it being understood that the frame is of the usual or any preferred construction having side beams and front and rear end portions. The ball extends downwardly, and is received within a two-part socket 16, the said socket comprising upper and lower portions provided with flanges securely bolted together, as indicated at 17 and having a depending reduced sleeve extension 18 formed with a two-part or other form of housing 19 of circular formation, in conjunction with the front axle housing of the machine, which receives the front axle 20, the ends of which are keyed to the front steering and driving wheels 21.

Mounted upon the frame is a motor or prime mover 22 of the internal combustion or other type, having a fly wheel 23 and provided with a universal or knuckle joint 24 by which its power shaft 25 may be directed downwardly at an acute angle toward the rear of the frame. This shaft extends into a gear housing 26 and is journaled in the front and rear walls thereof, as shown particularly in Fig. 1 of the drawings. Fixed to the shaft 25 is a spur gear or pinion 27 adapted to mesh with a larger spur gear or pinion 28 fixed to an inclined rearwardly disposed shaft 29 journaled in a housing 30, preferably made in two sections and supported by the gear housing 26 at the inner ends of said sections. This housing extends from the top of the frame at the front, above the attaching plate of the ball member 15 to the rear axle housing, at which end the shaft 29 carries a miter gear 31 meshing with a beveled or miter gear 32 fixed to the rear axle 13, so that the rear wheels may be operated to propel the vehicle forwardly or rearwardly, according to the direction of rotation of the motor. It is of course to be understood that any suitable differential drive mechanism may be employed, to produce the variable speeds in addition to forward and reverse drives.

The lower portion of the ball 15 is cut or hollowed out, as indicated at 33, and vertically journaled through the upper portion of the ball at the shank thereof and axially, is a shaft 34 on the upper end of which is fixed a beveled or miter gear 35 meshing with a similar gear 36 fixed to the upper and forward end of the shaft 29, said gears being inclosed within a housing 37 so that like the housing 26 and the housings 12, 19 and 30, the parts contained therein, may run in oil or other suitable lubricant or grease, so that reduced friction will result and so that the life of the parts used may be lengthened. The lower end of the shaft 34, which is made in two sections, carries a bevel or miter gear 38 meshing with a similar but larger gear 39 fixed to the forward or front steering and driving shaft 20, while the sections of the shaft 34 are connected within the hollowed out portion of the ball 15 by means of a knuckle joint 40. This latter joint is disposed at the center of the ball and socket joint constituted by the parts 15 and 16, and which serve as the front portion of the frame and on which the front axle and steering wheels may be turned for guiding the machine in the proper or desired direction, in addition to permitting rocking movement so that the front steering and driving wheels may be allowed to compensate for unevenness in the road surfaces. Thus, it will be seen that when the motor is operated and suitably connected to the drive shaft 29, motion will be transmitted to the front and rear axles and wheels so as to propel the vehicle by means of all four wheels. In addition, the frame may be suitably braced by a longitudinal truss rod 41 extending between the rear portion of a fork 42 and the bottom portion of the rear axle housing to which it is attached, as shown at 43. The fork 42 is adapted to pivotally receive the lower portion of the front axle housing 19, as indicated at 44, axially in alinement with the shaft 34 and the upper portion of the fork is formed with a sleeve 45 engaging the sleeve portion 18, so as to brace and receive the shank portion of the socket member 16 for turning movement therein in conjunction with the front axle. The truss rod 41 is braced to the rear axle housing through the medium of side braces 46, thus giving the necessary rigidity to the running gear to prevent injury thereto when striking obstructions or depressions in a road. In addition, the front and rear axles are provided at the bottom with truss rods 47 which are connected to the globular intermediate portions thereof at the bottom, and to the axle housings adjacent to each wheel. It will be seen that by having the ball and socket joint constituting the swivel and rocker connection between the front axle or running gear and the frame or chassis, the front part will be properly strengthened without interfering with the steering action, it being understood that any suitable steering mechanism may be employed for turning the front axle or running gear, for this purpose. In addition, the knuckle joint 40 permits the necessary angular disposition of the sections of the shaft 34 to permit the front axle to be driven, even though the sections of the ball and socket joint formed by the parts 15 and 16, may be disposed in different angular relations. For purposes of convenience in the accompanying claims, we will refer to the ball and socket member constituted by the parts 15 and 16 as a primary knuckle or ball and socket joint, and to the parts of the knuckle or ball and socket joint 40, as the secondary knuckle or ball and socket joint.

In view of the foregoing, it is thought that the operation of the device will be readily understood and in view of the simplicity and practical value, that it will commend itself to those skilled in the art. However, we desire to say that while we have described the spur gear or pinion 27 of the shaft 25 meshing with a spur gear or pinion 28 on the shaft 29, the miter gear 31 at the rear end of the shaft 29 similarly relating to the beveled or miter gear 32 on the rear axle 13, and the bevel or miter gear 38 at the lower end of the shaft 34 having a similar correlation to the beveled or miter gear 39 on the front steering and driving shaft or axle 20, we have also and specifically shown suitable differential drive mechanism at said connections, as is common in the art. As shown, the spur gear or pinion 28 is disposed at the inner ends of the sections of the shaft 29, beveled or miter gear 32 is similarly related to the sections of the rear axle 13 and the bevel or miter gear 39 has a similar correlation to the sections of the front steering and driving shaft or axle 20, with suitable supplementary gears to constitute the differential. In the first instance, there is a straight drive, the wheels on both sides being positively driven at the same speed, while in the latter, the front and rear wheels may vary in size, this being compensated for by the shaft 29 being made in sections carrying pinions at their inner ends and the gear 28 loose on said shaft and by reason of the differential pinions or gears provided in conjunction with the gear 32 on the rear axle 13 and the gear 39 on the front axle 20, the wheels at opposite sides may run at different speeds, as in making turns. Otherwise, the turning of the front axle must be wholly depended upon in turning the vehicle, that is, the steering motion on the primary ball and socket joint. It is also to be understood that suitable changeable speed transmission or drive mechanism may be employed between the motor and the shaft 29 to give high, intermediate and low speeds or reverse, if desired, as is common in the art.

Having thus described our invention, what we claim is:—

The combination with an automobile frame and a motor mounted on the frame; of a rear axle housing connected to the frame; an axle rotatable therein and having drive wheels fixed thereto, a longitudinal shaft geared to the rear axle, a housing inclosing portions of the engine shaft and the longitudinal shaft, gearing mounted on said shafts within the housing, a front axle housing, an axle journaled therein and having drive wheels fixed to the ends thereof, a driving and turning gear for the front axle including a relatively large ball member provided with an attaching plate secured to the front of the frame and having a hollowed out portion, a socket member receiving said ball at the bottom and provided with a reduced sleeve portion joined with the front axle housing, a shaft journaled through said sleeve portion and ball member and provided with a knuckle joint in the center thereof, said shaft being formed in two sections and having geared connection with the front axle at its lower end, a geared connection between the upper end of said vertical shaft and the forward end of the longitudinal shaft, a truss rod connecting the front and rear axle housings and having a fork member provided with a bearing portion for the reduced sleeve of the large socket member, and braces extending from said truss rod to the rear axle, said longitudinal shaft extending in a rearwardly inclined position from the frame at the front to the rear axle at the rear.

ROY DALTON SMITH.
ALFRED CHRISTOPHERSON.